United States Patent [19]

Iwasaki et al.

[11] Patent Number: 4,760,524
[45] Date of Patent: Jul. 26, 1988

[54] MICROCOMPUTER HAVING AT LEAST ONE INPUT-OUTPUT UNIT

[75] Inventors: Junichi Iwasaki; Akira Kuwata, both of Tokyo, Japan

[73] Assignee: NEC Corporation, Tokyo, Japan

[21] Appl. No.: 764,918

[22] Filed: Aug. 12, 1985

[30] Foreign Application Priority Data

Aug. 10, 1984 [JP] Japan ................... 59-167481

[51] Int. Cl.⁴ .............................. G06F 7/10
[52] U.S. Cl. .................................. 364/200
[58] Field of Search ... 364/200 MS File, 900 MS File

[56] References Cited

U.S. PATENT DOCUMENTS

| 4,276,594 | 6/1981 | Morley | 364/200 |
| 4,378,589 | 3/1983 | Finnegan et al. | 364/200 |
| 4,402,042 | 8/1983 | Guttag | 364/200 |

Primary Examiner—Raulfe B. Zache
Assistant Examiner—Ayni Mohamed
Attorney, Agent, or Firm—Sughrue, Mion, Zinn, Macpeak & Seas

[57] ABSTRACT

A microcomputer includes a central processing unit and at least one input-output (peripheral) unit selected by an address on a single semiconductor chip. The microcomputer further has an address changing circuit for assigning an arbitrary address to the input-output unit, so that the input-output address can be accessed by a variable address.

4 Claims, 10 Drawing Sheets

MICROCOMPUTER HAVING AT LEAST ONE INPUT-OUTPUT UNIT

BACKGROUND OF THE INVENTION

The present invention relates to a microcomputer, and is particularly concerned with a microcomputer with a central processing unit (CPU) and at least one input-output unit incorporated on the same semiconductor chip.

DESCRIPTION OF THE PRIOR ART

As one of techniques for miniaturization and weight-reduction of a computer system, which is hitherto composed of a CPU chip, timer/counter chip, interrupt control unit chip, and other peripheral units, high integration method prevails, which integrates CPU and peripheral functions like timer function and interruption function on one chip. However, in a conventional microprocessor including input-output (peripheral) units together with a CPU on a single semiconductor chip, I/O addresses assigned to each input-output unit have been fixed. In general, each input-output unit includes a plurality of registers, which are designated by predetermined addresses. In this case, when a data transmission between the CPU and one register in an input-output unit is performed, the CPU sends to a decoder an address assigned to the register to be selected. The decoder decodes the address from the CPU and generates a selecting signal which is directly applied to the register through a decoder output line. Thus, the register designated by the CPU is selected.

However, since I/O addresses assigned to the registers in the input-output units are predetermined and fixed by a hardware logic circuit, change of I/O addresses to be assigned to the peripheral (input-output) units is impossible. Therefore, such a software that employs I/O addresses different from those fixed on the chip to designate the registers in the input-output units can not be used in the conventional one-chip microprocessor.

Further, an adress space having a plurality of sequential addresses is used as I/O addresses in general. Therefore, in practical use there are some addresses which are not used in the address space as I/O addresses. However, since all I/O addresses in the assigned address space are fixed, addresses which are not used in the address space can not be used for other purposes. That is, a conventional microcomputer has a disadvantage that a user can not use the address space effectively.

SUMMARY OF THE INVENTION

An object of the present invention is to provide a microcomputer in which I/O addresses are changeable.

Another object of the present invention is to provide a microcomputer in which an address space assigned to at least one input-output (peripheral) unit can be used effectively.

Still another object of the present invention is to provide a microcomputer in which an address of a register in an input-output (peripheral) unit can be easily changed by a software.

A microcomputer of the present invention includes a central processing unit (CPU), at least one input-output unit having at least one register, a first circuit for storing an address designating the register, a second circuit for writing the address into the first circuit, a third circuit for comparing an I/O address supplied from the CPU for selecting the register according to a program to be executed in the microcomputer with the address stored in the first circuit, and a fourth circuit selecting the input-output unit determined by the stored address in response to a predetermined result of the comparison by the third circuit. These CPU, input-output unit and first to fourth circuits are integrated on a single semiconductor chip.

According to the present invention, the CPU can write an address determined by a program into the first circuit by using the second circuit before the program is executed. Thereafter, when an access of the input-output unit is required under the program execution, the CPU supplies an I/O address to select the register to the third circuit. The third circuit compares the I/O address sent from the CPU with the address stored in the first circuit. If two addresses are equal, the third circuit applies a selecting signal to the register in the input-output unit by use of the fourth circuit. Thus the register becomes an accessibe state. On the other hand, when a different program having a different I/O address is performed, the CPU changes the content of the first circuit before the different program is performed. Thus, any different programs can be performed by the microcomputer of the present invention. Further, if an address different from the address stored in the first circuit is used in the CPU, the register is not selected by this different address, and therefore, the different address can be used as other purpose, for example as a memory, an external input-output unit. In the present invention, output of the first circuit is favorably coupled to one of two inputs of the third circuit and the I/O address from the CPU is favorably supplied to the other inputs of the third circuit. The fourth circuit is favorably a selection line coupled between the output of the third circuit and a selection terminal of the input-output unit. Thus, if the two inputs of the third circuit is in coincidence, the comparison signal is directly applied to the inputoutput circuit as a selection signal. An associative memory may be used for the first and third circuit in combination.

DESCRIPTION OF THE PRIOR ART

Figure 1:
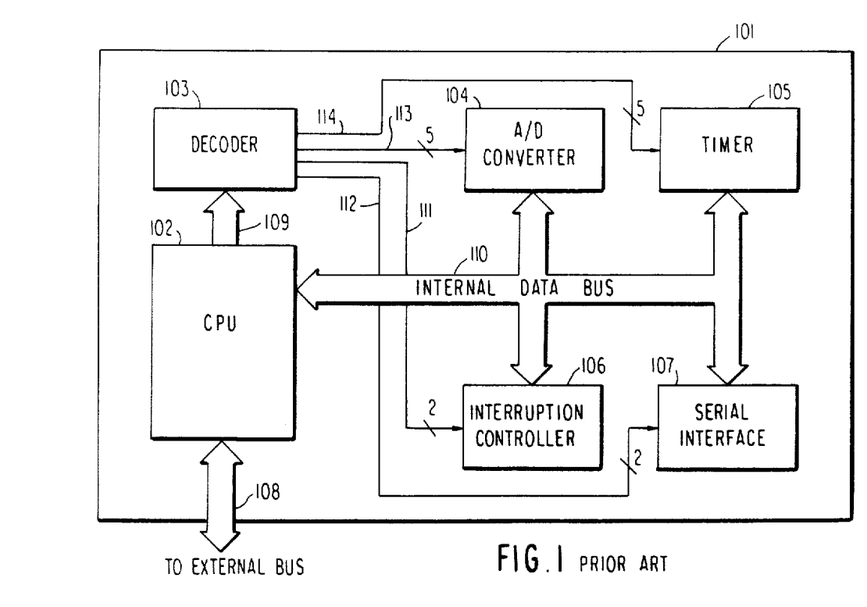
FIG. 1 is a block diagram of an example of a conventional microcomputer.
Figure 2:
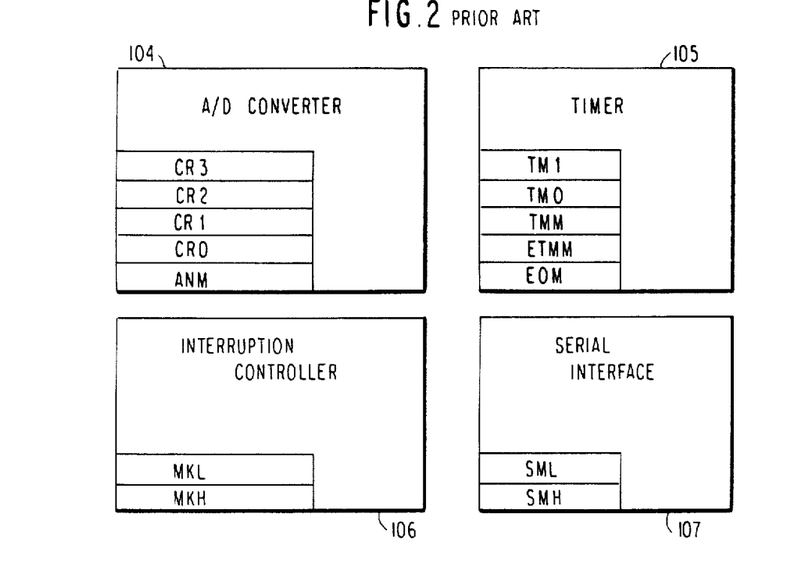
FIG. 2 is a drawing representing a register configuration of internal I/O 104 to 107 of FIG. 1.
Figure 3:
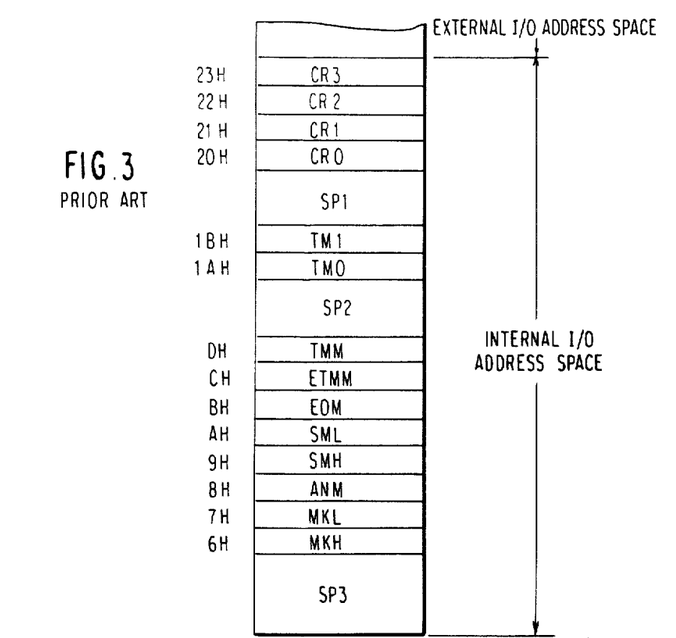
FIG. 3 is an I/O address map of the registers of FIG. 2.

FIG. 1 is a block diagram of a microcomputer 101 having internally an A/D converter 104, a timer 105, an interruption controller 106, and a serial interface 107 as input-output (peripheral) units (hereinafter called I/O) together with a CPU 102 on a single semiconductor chip. The CPU 102 can transfer data to and from an external bus through a bus 108. The internal I/O such as A/D converter 104, timer 105, interruption controller 106, serial interface 107 are initialized according to an execution of input/output instruction of CPU 102 before a program is executed. When CPU 102 executes the input/output instruction, a predetermined address of the accessed internal I/O is output to a decoder 103 through an address bus 109. Here, the internal I/Os 104 to 107 have a register group each as shown in FIG. 2, and an I/O address is allocated to each register as shown in FIG. 3. For example, two registers MKH, MKL are provided in the interruption controller 106, and addresses 6H and 7H are assigned to the register MKH and the register MKL respectively as I/O addresses. The decoder 103 decodes an address inputted through the address bus 109 and generates a select signal to the corresponding register according to the I/O address shown in FIG. 3. The select signal is sent to the interruption controller 106 through one of two signal lines 111. With respect to other I/O units, five signal lines 113 are provided to registers ANM, CR1, CR1, CR2, CR3 in the A/D converter unit 104, five signal lines 114 being provided to five registers EOM, ETMM, TMM, TM0, TM1 in the timer unit 105, two signal lines 112 being provided in two registers SMH, SML in the serial interface unit 107, namely registers in four I/O units are connected to the decoder directly by 14 signal lines. That is, the 14 I/O addresses ($6_H$ - $9_H$, $1A_H$ - $1B_H$, $20_H$ - $23_H$) are assigned and are fixed on a hardware logic and hence is not changed by a software. Here, H means a hexadecimal representation.

As described above, in the prior art microprocessor, since I/O addresses are predetermined and are fixed, they can not be changed to other addresses. Therefore, a program having addresses $1A_H$ and $1B_H$ as the addresses of the interruption control unit 106 can not be executed by the microcomputer shown in FIG. 1. Therefore, an I/O driver (input-output unit control program) of the program must be modified. Further, as shown in FIG. 3, an internal I/O address space and an external I/O address space are fixed, respectively, in the conventional processor, therefore the address spaces SP1, SP2 and SP3 cannot be used as, for example, the external address space, even if these spaces SP1, SP2 and SP3 are not used as the internal I/O address space.

The conventional microcomputer is not satisfactory to have the defect that (1) the internal I/O address cannot be changed arbitrarily, (2) since the external I/O address cannot be inserted in the internal I/O address space, the address space can not be used effectively, (3) a useless address space is left in the internal I/O address space and so forth.

DETAILED DESCRIPTION OF THE EMBODIMENTS OF THE PRESENT INVENTION

Figure 4:
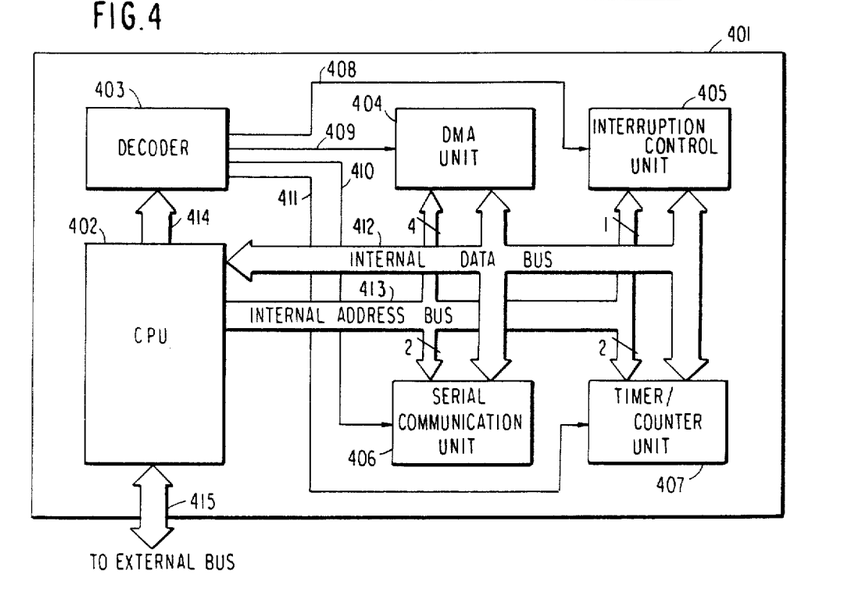
FIG. 4 is a block diagram of a microcomputer according to one embodiment of the present invention.

Embodiments of the present invention will now be described in detail with reference to the accompanying drawings. FIG. 4 is a block diagram of a microcomputer 401 with a CPU 402, a decoder 403 and four I/O units (a DMA unit 404, an interruption control unit 405, a serial communication unit 406 and a timer/counter unit 407) on a single semiconductor chip. These DMA unit 404, an interruption control unit 405, a serial communication unit 406 and a timer/counter unit 407 are connected to the CPU 402 by means of a internal data bus 412 and an internal address bus 413. The decoder 403 includes an associative memory as described in detail hereinafter. The decoder 403 receives an address from the CPU 402 and decodes it. As the result, the decoder 403 generates one of selecting signals 408 to 412 for selecting the corresponding I/O unit. In this case, it should be noted that the selecting signals 408 to 412 are not used to select registers in each I/O units but used to select the I/O unit itself.

Figure 5:
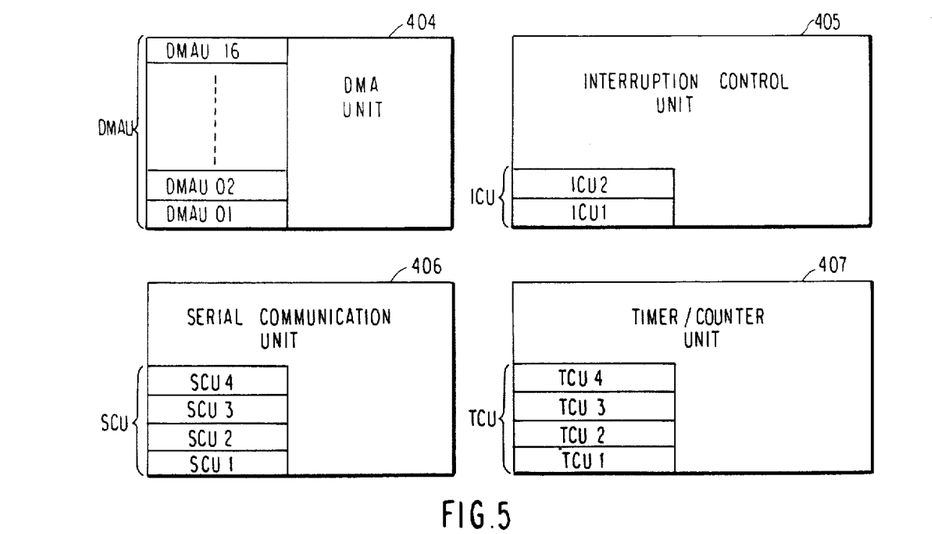
FIG. 5 is a drawing showing a register configuration of internal I/O 404 to 407 of FIG. 4.

Then, as shown in FIG. 5, the internal I/O units 404 to 407 have internal register groups DMAU, ICU, SCU and TCU, respectively, In this embodiment, DMAU, ICU, SCU and TCU have 16 registers, 2 registers, 4 registers and 4 registers, respectively. These registers are selected by a lower address transferred through the internal address bus 413 having 4 bit signal lines.

Figure 6:
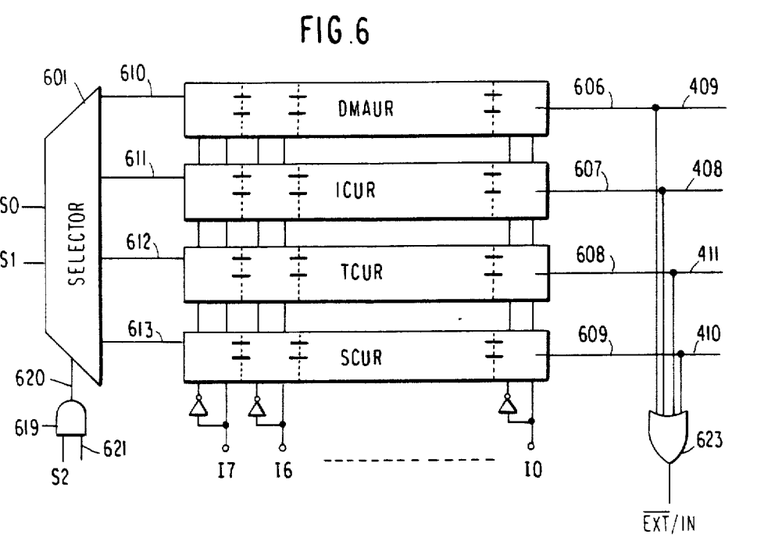
FIG. 6 is a circuit diagram representing ne operative example of the decoder 403 of FIG. 4.

FIG. 6 is a circuit diagram representing one embodiment of the decoder 403 of FIG. 1. DMAUR is an associative memory storing an I/O address to be assigned to DMA unit 404, ICUR is an associative memory storing an I/O address to be assigned to the interruption control unit 405, TCUR is an associative memory storing an I/O address to be assigned to the timer/counter unit 407, SCUR is an associative memory storing an I/O address to be assigned to the serial communication unit 406, all coming in eight bits. One of the associative memories DMAUR, ICUR, TCUR and SCUR is selected according to two address bits S0 and S1 sent from the CPU. Then the selective associative memory is allowed to a write enable state by an output 610, 611, 612 or 613 of a selector 601 performing a decoding operation according to the received two address bits S0 and S1. The CPU 402 sends an information as to an address to be assigned to an input/output unit to the memories in common. Thus, the information sent from the CPU 402 is written into the selected memory. Where, the selector 601 is activated by an output 620 of an AND gate 619 to which a signal S2 and a signal 621 is applied. The signal S2 is generated when the CPU 402 outputs an address designating the four associative memories DMAUR, ICUR, TCUR and SCUR, while the signal 621 is generated when an information is written into the associative memories. Thus, only when the address for designating one of the associative memories is outputted from the CPU 402 in a write operation mode, the selector 601 is activated to perform the decoding operation in accordance with the inputted two address bits S0 and S1. At this state, the CPU 402 can write an arbitrary information as to the address to be assigned to the I/O units 404 to 407 into the associative memories. In general, this writing operation will be performed before a program is executed by the microcomputer.

After the write operation for the four associative memories is terminated, an execution of the program is allowed. In the program execution, an address outputted from the CPU 402 is sent to the input terminals I0 to I7 through the bus 109 and is compared with the information written into each associative memory. If the address applied to the associative memories coincides with one of the information stored in the associative memories, a selecting signal 408, 409, 410 or 411 is generated from the associative memory storing the information coincident with the applied address. This selecting signal (e.g., "1" level signal) is applied to the corresponding I/O unit 404, 405, 406 or 407. Thus, one of the I/O unit is selected in response to the selecting signal generated from the associative memory. On the other hand, when the applied address does not coincide with any information stored in the four associative memory, no selecting signal is generated. That is, "0" level signals are present at all signal lines 408 to 411, and therefore an output of an OR gate 623 becomes a "0" level. This means that no I/O unit is selected according to the address derived from the CPU 402. Therefore, this address can be used to designate a memory or an external I/O unit other than the four internal I/O units 404 to 407.

Figure 7:
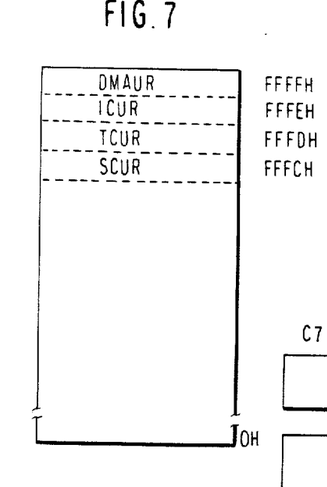
FIG. 7 is an I/O map of associative memories DMAUR, ICUR, TCUR, SCUR of FIG. 6.
Figure 8:
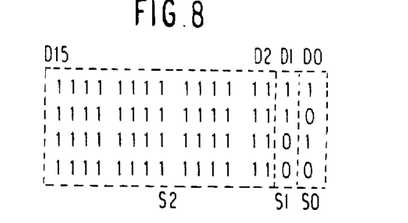
FIG. 8 is a drawing for binary representation of I/O addresses of the associative memories DMAUR, ICUR, TCUR, SCUR of FIG. 6.

In the above explanation, an output instruction can be used for setting the information of the associative memories, the associative memories DMAUR, ICUR, TCUR, SCUR are allocated at upper four bytes of a 64 k byte ($0000_H$ to $FFFF_H$) I/O address space as shown in FIG. 7. For example, the associative memory DMAUR is allocated at $FFFF_H$, the associative memory ICUR at $FFFE_H$, the associative memory TCUR at $FFFD_H$, and the associative memory SCUR at $FFFC_H$. If these addresses $FFFC_H$ to $FFFF_H$ are represented in binary form, upper bits D2 to D15 are all "1" as shown in FIG. 8, and if it is represented by S2, then S2="1". Now, if a lower bit D0 is S0 and a lower bit D1 is S1, the associative memories DMAUR, ICUR, TCUR, SCUR are selected according to the following table 1:

TABLE 1

|  | S2 | S1 | S0 |
| --- | --- | --- | --- |
| DMAUR | 1 | 1 | 1 |
| ICUR | 1 | 1 | 0 |
| TCUR | 1 | 0 | 1 |
| SCUR | 1 | 0 | 0 |

In accordance with the TABLE 1, the information as to the DMA unit 404 is written into the DMAUR designated by the address $FFFF_H$. That is, when the output instruction is executed and when the address $FFFF_H$, is sent to the decoder 403, the associative mmeory DMAUR is selected. Referring to the process according to FIG. 6, in the address $FFFF_H$, S2="1", and the signal 621 becomes "1", thus an output signal 620 of the AND gate 619 also becomes "1". When the signal 620 becomes "1", the decodeer 601 is activated, and one of the signals 610 to 613 becomes "1" according to information of S0 and S1. Where the address is $FFFF_H$, since S1="1" and S0="1" from TABLE 1, the associative memory DMAUR is selected by the signal 610 being "1", and thus information are written in DMAUR under a write enable state. A setting of the information of DMA unit 404 is thus completed. The same operation is repeated to write the information as to the remaining associative memories.

In a program execution, when the address to select the DMAUR is inputted through the terminals I0 to I7, each information stored in the associative memories DMAUR, ICUR, TCUR and SCUR are compared with the inputted address. At this state, the information in the associative memory DMAUR coincides with the inputted address. Therefore, the signal 606 becomes "1", and then the DMA unit 404 is selected. At this moment, an output of the OR gate 623 becomes "1" to indicate that the internal I/O unit is selected.

Figure 10:
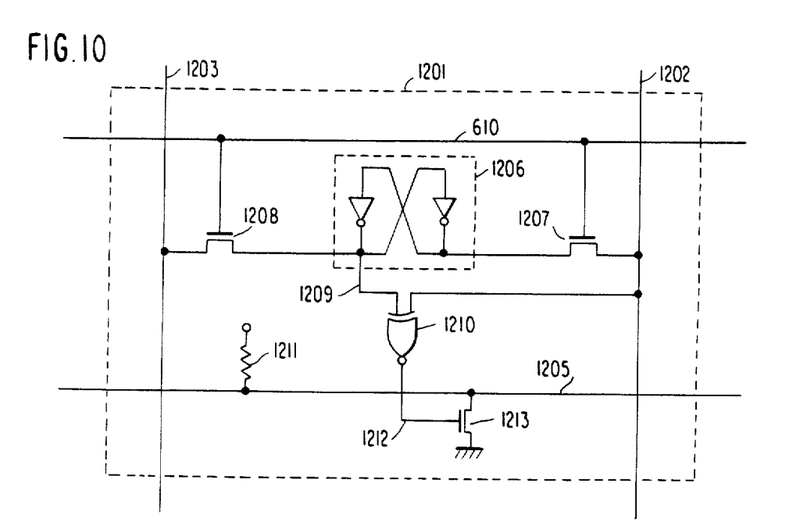
FIG. 10 is a circuit diagram representing a basic configuration of associative memory cells.

A circuit diagram shown in FIG. 10 represents a preferred embodiment of one memory cell in the associative memories DMAUR, ICUR, TCUR, SCUR. A memory cell 1201 shown in FIG. 10 is a most left cell of the DMAUR. A signal line 1202 is coupled to the terminal I7 directly, while a signal line 1203 is coupled to an invertor connected to the terminal I7. Therefore, if the signal line 1202 is "1", the signal line 1203 becomes "0", and if the signal line 1202 is "0", the signal line 1203 becomes "1". The signal line 610 is coupled to input gates of two switching transistors 1207 and 1208. A write data is incoming through the signal lines 1202 and 1203. When the signal line 610 is "1", transistors 1207 and 1208 are turned on both, and the write data is written into a memory circuit 1206 through the signal lines 1202 and 1203. Once the data is written into the memory circuit 1206, the memory circuit 1206 holds the written data until the next newly writing operation is performed. On the other hand, when a comparison operation is performed, the signal 610 is "0" because the selector 601 is in inactivate, and the transistors 1207 and 1208 are both turned off. When an address to be selected to the DMA unit is transferred to the associative memories, it is applied to the signal line 1202 which is connected to a two-input exclusive OR gate 1210. A signal line 1209 from the memory circuit 1206 is connected to another input end of the EX OR gate 1210. Here, when a data on the signal line 1202 does not coincide with a data on the signal line 1209, the situation is such that the address coincides with a storage information, and an output signal 1212 of the two-input exclusive OR gate 1210 becomes "0". When a data on the signal line 1202 coincides with a data on the signal line 1209, the situation is such that the address does not coicide with the storage information, and the output signal 1212 of the two-input exclusive OR gate 1210 becomes "1". Since a signal line 1205 is preliminarily precharged to "1" by the pull-up resistor 1211, when a transistor 1213 is turned on with the output signal line 1212 at "1", the signal line 1205 becomes "0". While, the signal line 1205 is "1" when the input data coincides with the storage data because the signal line 1205 is "0". The basic configuration of the associative memory cells as described above are connected through the signal line 610 and the signal line 1205 in parallel.

Figure 9:
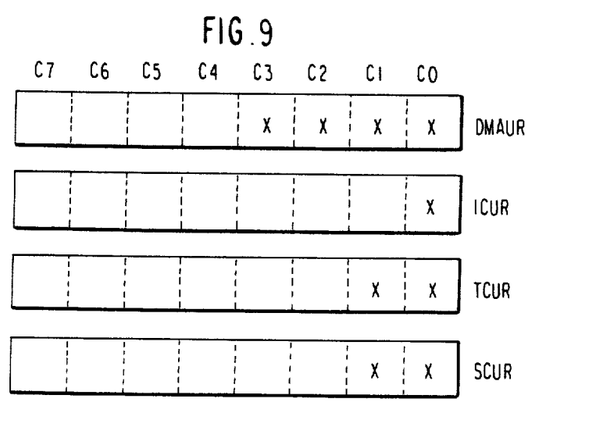
FIG. 9 is a drawing representing a memory cell configuration of the associative meories DMAUR, ICUR, TCUR, SCUR of FIG. 6.

Here, in this embodiment, the DMA unit 404 includes 16 registers DMAU01 to DMAU16 as shown in FIG. 5, and therefore, lower 4 bits of the address generated by the CPU are applied to the DMA unit through the internal address bus 413 of FIG. 4 for designating one of these 16 registers. Therefore, upper 4 bits of the address may be applied to the DMAUR associative memory. That is, the DMAUR associative memory may have four memory cells corresponding to the upper four address bits. In the same way, the interrupt control unit (ICU) 405 includes only one register ICUR, and therefore upper 7 address bits are used to access the ICUR associative memory. With respect to the timer/counter unit 407 and the serial communication unit 406, they include two registers, respectively, upper 6 address bits are used to select these I/O units 406 and 407. Therefore, as shown in FIG. 9, the ICUR, TCUR, SCUR associative memories include 7, 6 and 6 registers, respectively. In FIG. 9, X mark means no memory cell is required.

An I/O address space in the embodiment is 64K byte (0 to FFFF$_H$), however, in a practical microcomputer system, the I/O address space is ready at 256 byte (0 to FF$_H$), threfore an address bit length of the associative memory is specified at lower 8 bits, and the upper 8 bits are fixed at 00$_H$, thereby expecting an effect of retrenching the hardware.

Figure 11:
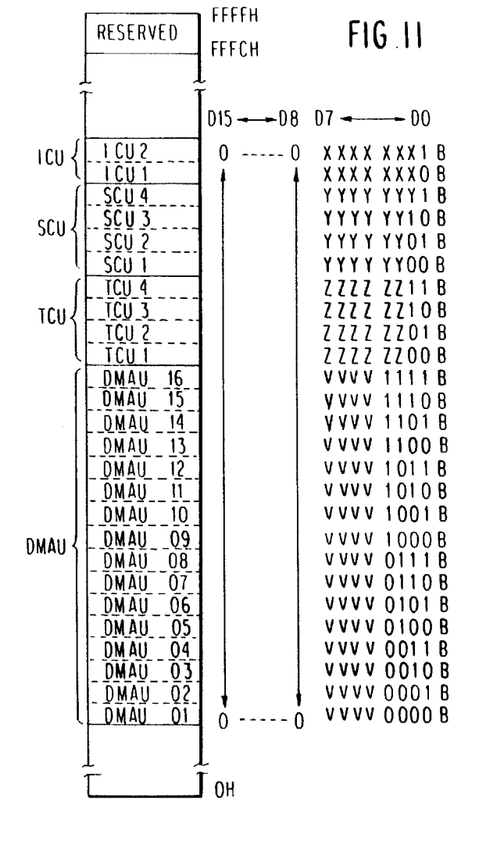
FIG. 11 is an I/O map of the embodiment of the invention.

Next, a description will be given in detail of the portions whereat memory cells C0 to C3 of the associative memory DMAUR, C0 of the associative memory ICUR, C0 and C1 of the associative memory TCUR, and C0, C1 of the associative memory SCUR are not present. As shown in FIG. 11, the register in each of the internal I/O units 404 to 407 has its address allocated beforehand in the I/O units 404 to 407. Needless to say, the system can be made programmable as high as an address level of the register of each of the I/O units 404 to 407, however, the associative memory for storing the addresses must be provided by the same number so as to cope with an increment in that of total I/O registers consequently, the hardware increases accordingly, and a work for setting I/O addresses of each I/O register becomes complicated. Here, the prevailing I/O has its internal registers arrayed regularly as shown in FIG. 11. That is, the I/O address of the internal register is common for the upper bits per I/O, and by decoding the lower several bits, the address is allocated regularly from the lower address to the upper address. In FIG. 11, bits with a mark V of the addresses DAMU 01 to DMAU 16, bits with a mark Z of TCU 1 to TCU 4, bits with a mark Y of SCU 1 to SCU 4, and bits with a mark X of ICU 1 and ICU 2 are common with each other and so programmable. That is, the portions with marks V, Z, Y, X can be set to arbitrary addresses by setting DMAUR, TCUR, SCUR, ICUR in FIG. 6, and further the register to select is determined by decodig the lower several bits within each of the I/O units 404 to 407. That is, the portions whereat memory cells of the lower bits are not present correspond to input bit number of the internal I/O addresses inputted to each of the I/O units 404 to 407 in FIG. 4.

In the decoder 403 of FIG. 4, an address information inputted through an address bus 414 is decoded, a select signal is generated to the accessed internal I/O unit, and the select signal is output to one of the select signal line 408 to 411. For example, if DMAU 1 in the DMA unit 404 is accessed, the decoder 403 outputs a select signal to the select signal line 409. Then, if DMAU 16 is accessed, the decoder 403 outputs a select signal likewise to the select signal line 409 and selects the DMA unit 404. That is, if either register DMAU 01 or DMAU 16 in the DMA unit 404 is selected, the select signal is output to the one select signal line 409 only. On the other hand, as shown in FIG. 11, a different I/O address is allocated to the registers DMAU 01 and DMAU 16, therefore both the registers DMAU 01 and DMAU 16 must be identified definitely. Accordingly, lower four bits of the address are inputted, as shown in FIG. 4, to the DMA unit 404 through the internal address bus 413. When the lower four bits come in "0000", DMAU 01 is selected, and when the lower four bits come in "1111", DMAU 16 is selected. The lower one bit is inputted to the interruption controller 405 likewise through the internal address bus 413, the lower two bits are inputted to the serial communication unit 406, the lower two bits are inputted to the timer/counter unit 407, and thus the internal register to be selected is determined.

Figure 12A:
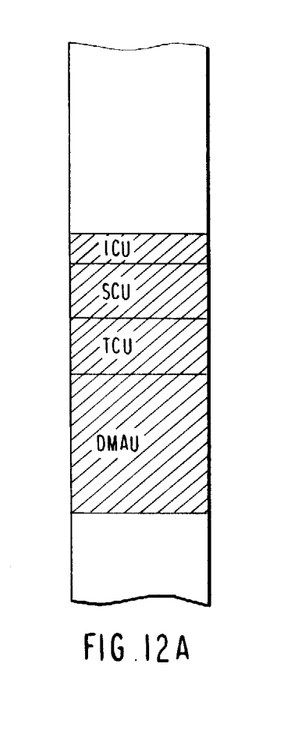
FIG. 12 is an I/O map of the embodiment.
Figure 12B:
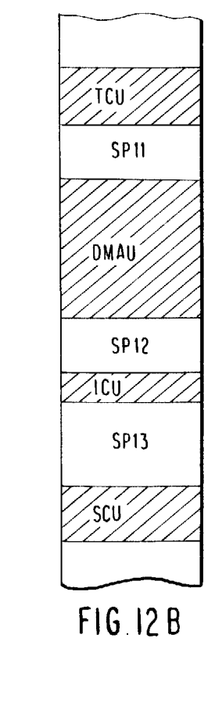

Next, an I/O map of the embodiment is shown in FIG. 12. FIG. 12 (A) shows an example wherein the I/O units 404 to 407 are programmed consecutively, and FIG. 12 (B) shows an example wherein the internal I/O units 404 to 407 are programmed at intervals.

I/O address spaces SP11, SP12, SP13 of FIG. 12 (B) are not used as internal but can be used to external I/O. That is, in FIG. 4, the four select signal lines 408 to 411 will be detected as "0" all, thereby accessing to external I/O. In other words, the system configuration can be adjusted freely irrespective of internal I/O and external I/O, therefore movability from an existing system is secured elastically thereby.

According to the present invention, an I/O address of the internal I/O will be set arbitrarily in a microcomputer by software, thereby transplanting the software on an existing system without modifying the I/O address, and thus miniaturization and lightweight requirements can be met within a short period of time.

According further to the invention, there is no distinction particularly provided for internal I/O space and external I/O space, and an I/O address space left unused as internal I/O can be used for external I/O. I/O addresses of input-output units incorporated on a chip and external input-output units can thus be set arbitrarily, and hence a degree of freedom of a system configuration is exceedingly high.

What is claimed is:

1. A microcomputer comprising a central processing unit executing a program, a plurality of input-output units, a plurality of selection lines respectively coupled to said input output units, a bus interconnecting said central processing unit and said input-output unit, said central processing unit generating address information designating one of said input-output units, a plurality of associative memory means respectively coupled to said selection lines, address data lines coupled in common to said plurality of associative memory means, means coupled to said plurality of associative memory means and to said address data lines for writing preset information into each of said plurality of associative memory means via said common address data lines, means coupled to said central processing unit and said address data lines for supplying said address information from said central processing unit to said plurality of associative memory means via said address data lines, and means for selecting the one of said selection lines that is coupled to the one of said associative memory means which stores the preset information coincident with said address information supplied from said central processing unit.

2. The microcomputer as claimed in claim 1, wherein said central processing unit, said input-output units, said selection lines, said bus, said plurality of associative memory means, said address data lines, said writing means, and said supplying means are integrated on a single semiconductor chip.

3. The microcomputer as claimed in claim 1, wherein said input-output units includes a DMA unit, an interruption control unit, a serial communication unit, and a timer/counter unit.

4. A microcomputer comprising a central processing unit, a plurality of input-output units each including a plurality of registers, a plurality of associative memory means, a data bus interconnecting said central processing unit and each of said input-output units, a first address bus interconnecting said central processing unit and each of said associative memory means, a second adress bus interconnecting said central processing unit and each of said input-output units, a plurality of selection lines each connected between each of said input-output units and each of said plurality of associative memory means, means coupled to said plurality of associative memory means for writing preset information into each of said plurality of associative memory means, said central processing unit producing a first address information selecting one of said input-output units and a second address information selecting one of said registers, means for transferring said first address information to said plurality of associative memory means via said first address bus, means for transferring said second address information to said plurality of input-output units via said second address bus, and means for selecting the one of said selection lines that is coupled to the associative memory means storing the preset information identical to said first address information, whereby the one of said input-output units connected to the selected selection line is selected and one of said registers included in the selected input-output unit is selected by said second address information.

* * * * *

UNITED STATES PATENT AND TRADEMARK OFFICE
CERTIFICATE OF CORRECTION

PATENT NO. : 4,760,524
DATED : July 26, 1988
INVENTOR(S) : Iwasaki et al

Page 1 of 2

It is certified that error appears in the above-identified patent and that said Letters Patent is hereby corrected as shown below:

| | |
|---|---|
| COLUMN 1, LINE 42 | Delete "adress" and insert --address--; |
| COLUMN 2, LINE 40 | Delete "inputoutput" and insert --input-output--; |
| COLUMN 2, LINE 55 | Delete "ne" and insert --one--; |
| COLUMN 2, LINE 63 | Delete "meories" and insert --memories--; |
| COLUMN 3, LINE 30 | After "ANM," delete "CR1," and insert --CRO,--; |
| COLUMN 5, LINE 46 | Delete "mmeory" and insert --memory--; |
| COLUMN 7, LINE 4 | Delete "threfore" and insert --therefore--; |
| COLUMN 7, LINE 29 | Delete "DAMU 01" and insert --DMAU 01--; |
| COLUMN 7, LINE 37 | Delete "decodig" and insert --decoding--; |

UNITED STATES PATENT AND TRADEMARK OFFICE
CERTIFICATE OF CORRECTION

PATENT NO.  : 4,760,524

DATED       : July 26, 1988

INVENTOR(S) : Iwasaki et al

It is certified that error appears in the above-identified patent and that said Letters Patent is hereby corrected as shown below:

COLUMN 7, LINE 46   Delete "line" and insert --lines--;

COLUMN 8, LINE 68   Delete "adress" and insert --address--;
Claim 13, line 7

Signed and Sealed this

Twenty-fourth Day of January, 1989

Attest:

DONALD J. QUIGG

*Attesting Officer*         *Commissioner of Patents and Trademarks*